United States Patent
Nikolai

(10) Patent No.: US 11,698,615 B2
(45) Date of Patent: Jul. 11, 2023

(54) SAFETY MODULE FOR A SAFE OPERATION OF AN AUTOMATION SYSTEM ASSEMBLY

(71) Applicant: Robert Bosch GmbH, Stuttgart (DE)

(72) Inventor: Horst-Dieter Nikolai, Michelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 16/889,183

(22) Filed: Jun. 1, 2020

(65) Prior Publication Data
US 2020/0401099 A1 Dec. 24, 2020

(30) Foreign Application Priority Data

Jun. 18, 2019 (DE) .................... 10 2019 208 813.9

(51) Int. Cl.
*G05B 19/05* (2006.01)
(52) U.S. Cl.
CPC .. *G05B 19/058* (2013.01); *G05B 2219/14006* (2013.01)
(58) Field of Classification Search
None
See application file for complete search history.

(56) References Cited

U.S. PATENT DOCUMENTS

| 5,218,690 | A * | 6/1993 | Boioli | G06F 13/4027 710/107 |
| 2005/0066212 | A1* | 3/2005 | Chiao | G06F 1/10 713/401 |
| 2006/0087773 | A1* | 4/2006 | Papenbreer | G05B 19/054 361/23 |
| 2009/0177290 | A1* | 7/2009 | Nikolai | G05B 9/02 700/21 |
| 2010/0146185 | A1* | 6/2010 | Stevens | G06F 13/385 711/E12.019 |
| 2013/0335865 | A1* | 12/2013 | Kim | H02H 3/202 361/42 |
| 2017/0331929 | A1* | 11/2017 | Zielinski | H04W 76/10 |
| 2019/0107818 | A1* | 4/2019 | Scherrer | G05B 19/058 |
| 2021/0157293 | A1* | 5/2021 | Sawada | G05B 19/054 |
| 2021/0278816 | A1* | 9/2021 | Schweiker | G05B 19/0425 |

FOREIGN PATENT DOCUMENTS

| DE | 10 2008 051 514 A1 | 4/2010 |
| DE | 10 2008 056 069 A1 | 5/2010 |
| JP | 2009146039 A * | 7/2009 |

OTHER PUBLICATIONS

Allen-Bradley, "User Manual GuardLogix Controllers", Aug. 2012, Rockwell Automation, Rockwell Automation Publication 1756-UM020I-EN-P. pp. 28-29,61 (Year: 2012).*

* cited by examiner

*Primary Examiner* — Mohammad Ali
*Assistant Examiner* — David Earl Ogg
(74) *Attorney, Agent, or Firm* — Maginot, Moore & Beck LLP

(57) ABSTRACT

The disclosure relates to a safety module for an automation system assembly, having a safety component which is configured to implement a safe operation of the automation system assembly, and an adaptation component which is configured to mediate between the safety component and a communication system of the automation system assembly in order to incorporate the safety module into the automation system assembly, wherein the safety component and the adaptation component are constructed on separate circuit carriers and are connected in such a way that they are mechanically detachable and reconnectable.

12 Claims, 1 Drawing Sheet

SAFETY MODULE FOR A SAFE OPERATION OF AN AUTOMATION SYSTEM ASSEMBLY

This application claims priority under 35 U.S.C. § 119 to application no. DE 10 2019 208 813.9, filed on Jun. 18, 2019 in Germany, the disclosure of which is incorporated herein by reference in its entirety.

TECHNICAL FIELD

The present disclosure relates to safety module for an automation system assembly, and an automation system assembly having such a safety module.

BACKGROUND

Automation system assemblies, such as, for example, drive amplifiers or controllers, are used by machine manufacturers, for example to construct processing machines. The machine manufacturers must observe the relevant standards and machine guidelines here and therefore require components with which a safe operation of the machines is implementable in accordance with the machine guideline. In order to solve this problem, the applicant offers a safety module for automation system assemblies by means of which a safe operation of the automation system assemblies manufactured and sold by the applicant is implementable.

A safety module of this type is shown, for example, in DE 10 2008 051 514 A1 or DE 10 2008 056 069 A1. Safety controllers, in particular, are implementable by means of a safety module of this type. A safety controller is a mainly programmable logic controller with particular design elements in respect of the inputs, the processing and the outputs in order to be able to guarantee the required level of safety and availability for use in safety-critical systems.

Conventional safety models are normally designed as plug-in card solutions and are inserted into a corresponding slot of the automation system assembly. However, numerous slot or BUS standards exist, such as e.g. PCI, PCIe, so that just as many safety module variants need to be developed, certified and provided.

SUMMARY

According to the disclosure, a safety module is proposed for an automation system assembly, and also an automation system assembly with the features of the disclosure. Advantageous designs form the subject-matter of the detailed embodiments and the following description.

The safety module has a safety component and an adaptation component. The safety component is configured to implement a safe operation of the automation system assembly. The adaptation component is configured to mediate between the safety component and a communication system of the automation system assembly in order to incorporate the safety module into the automation system assembly. The safety component and the adaptation component are constructed on separate circuit carriers, such as e.g. printed circuit boards or ceramic or plastic circuit carriers, and are connected in such a way that they are mechanically detachable and reconnectable. Conventional connectors, in particular, such as e.g. plug-in connectors (plug/socket) which, if required, can simultaneously provide a data-transmitting connection, are also suitable for this connection.

According to the present disclosure, it is thus proposed to design the safety module as modular and subdivide it into at least two individual components or modules which are independent from one another. The functions necessary for the operation of the safety module are performed independently from one another in these two separate components. The separation of these functions of the safety module thus takes place at both software level and hardware level. The safety component and the adaptation component are thus also modules which are physically independent or separated from one another on separate circuit carriers which, if required, can be mechanically removed, added or exchanged in a flexible and individual manner.

The safety component is appropriately provided to perform the actual safety functions of the safety module in order to thus guarantee the safe operation of the automation system assembly. It therefore has, in particular, one or more computing units, such as e.g. microprocessors, application-specific integrated circuits (ASICs), etc. In particular, a communication with other parts of the automation system assembly is necessary for this purpose.

In order to enable a communication of this type via the communication system of the automation system assembly, the adaptation component is provided to connect the safety component in particular or the safety module in general to the communication system of the automation system assembly and to adapt the security module for a data exchange or a communication via the communication system of the automation system assembly. This adaptation or connection is performed, in particular, as a computer implementation, i.e. by means of executed software. The adaptation component further comprises, in particular, suitable hardware on which this corresponding software is executed for this purpose. The adaptation component is thus appropriately provided as an interface or as an adapter and can, for example, have corresponding protocols or configuration files. In other words, the adaptation component mediates between the communication system of the automation system assembly and the safety component. The safety component and the adaptation component have a data-transmitting and preferably also an energy-transmitting connection to one another. Conventional connectors, such as e.g. plug-in connectors (plug/socket), are suitable for this/these connection(s).

In a conventional manner, a connection of a conventional safety module to communication systems can often prove to be highly elaborate, since at least one elaborate configuration and certification is required for this purpose. The connection of conventional safety modules to new or unknown communication systems therefore usually incurs high costs and is highly labor-intensive, since an individual configuration and the issue of individual certifications are usually required for each communication system.

However, in a present safety module, the connection can be substantially simplified and costs and effort can be significantly reduced. Due to the modular separation between the safe logic and the adaptation logic, the safety module can be connected flexibly and simply to different communication systems, including new or unknown communication systems. In particular, no outlay is required in respect of the safety component or safe logic in order to adapt the safety module to different communication systems. All adaptation steps are appropriately carried out by the adaptation logic or the adaptation component. The adaptation component can be preconfigured, for example, for the connection to different communication systems. Due to the modular design, the adaptation component can appropriately also be flexibly exchanged. A new adaptation component can thus be provided, for example, for the connection to new or unknown communication systems.

In particular, a certification requirement can be significantly reduced due to the modular separation into the safety component and the adaptation component. In the industrial environment, safety-critical devices must be certified in order to attain, for example, a safety requirement level. The safety requirement level is a concept from the field of functional safety and is also referred to in international standardization according to IEC 61508/IEC 61511 as the safety level or safety integrity level (SIL). It serves to evaluate electrical/electronic/programmable electronic (E/E/PE) systems in terms of the reliability of safety functions. The safety-based design principles which must be observed so that the risk of a malfunction can be minimized are derived from the desired level. However, in the solution according to the disclosure, the safety-relevant functions are now concentrated in the safety component which must be certified once only. The communication functions in the adaptation module are not safety-relevant, so that is not necessary to perform a certification for the connection to the communication system. The safety module can thus be coupled to any communication systems with no further certification requirement.

The safety component is advantageously a certified component and the adaptation component is a non-certified component. The safety component is thus already certified, since a corresponding certificate or safety certificate has already been issued. The adaptation component appropriately represents a part which is irrelevant to the certification.

The adaptation component is advantageously configured to mediate between the safety component and a bus system as the communication system of the automation system assembly. The bus system may, for example, be PCI or PCIe or a fieldbus such as CAN, Ethernet/IP, Profinet, Sercos 2, Sercos III, EtherCAT, FlexRay, LIN, MOST, etc.

The safety component and the adaptation component preferably have a communication connection to one another via an internal communication system, in particular via an internal bus system. This internal bus system may, for example, be PCI or PCIe.

The adaptation component is advantageously configured to mediate between the internal communication system of the safety module and the (external) communication system of the automation system assembly. The adaptation component appropriately represents an interface between the internal and the external communication system in order to translate between these two communication systems.

The safety component preferably has a safety logic and the adaptation component has an adaptation logic. The safety component and the adaptation component in each case thus have logic units which in each case can comprise, for example, microcontrollers, memory units, (e.g. Dual Port RAM, etc.), programmable logic components, etc. In particular, the safety logic and the adaptation logic are therefore provided in each case as individual, independent computing units.

The safety component and the adaptation component are preferably designed in each case as printed circuit boards. The two modules or parts of the safety module are thus appropriately designed as separate, individual printed circuit boards, as a result of which the modular design and a high degree of flexibility can be achieved.

The safety module is appropriately designed as a plug-in card. Conventional designs of safety modules can therefore be retained.

The adaptation component further advantageously has a means for implementing an overvoltage protection. This is appropriately provided as a means for overvoltage monitoring and shutdown. In particular, an active overvoltage protection is thus provided which becomes active independently if an overvoltage is detected and instigates corresponding protective measures to protect the safety module. The means for implementing the overvoltage protection is particularly advantageously designed in the manner disclosed in the published patent applications DE 10 2008 051 514 A1 or DE 10 2008 056 069 A1 of the applicant. For further details regarding the mode of operation of such means for implementing the overvoltage protection, reference is therefore made to these documents DE 10 2008 051 514 A1 and DE 10 2008 056 069 A1, the disclosure of which is also incorporated into the content of this application.

The adaptation component further preferably has a voltage limitation or logic for voltage limitation for the safety component. In particular, this voltage limitation can be provided for the internal communication system or the internal bus between the adaptation component and the safety component.

The adaptation component further preferably has a voltage converter. A DC/DC converter of this type can be provided, in particular, in order to adapt the voltage supply within the automation system assembly, e.g. of the communication system of the automation system assembly, to the requirements of the safety component.

An automation system assembly according to the disclosure has a preferred design of a safety module according to the disclosure. In particular, the safety module is incorporated into the automation system assembly via the corresponding communication system of the automation system assembly. The automation system assembly can be designed, for example, as a safety controller or as a safe drive regulator.

The disclosure is suitable for a wide range of applications, for example for tunnel-boring machines, hydraulic punches/presses, general automations, semiconductor handling, robotics, etc. The disclosure is particularly suitable for machine control. A machine of this type can be designed, in particular, as a machine tool, such as, for example, a welding system, a screw system, a wire saw or a milling machine, or as a web processing machine such as e.g. a printing press, a newspaper printing press, a gravure printing press, a screen printing press, an inline flexographic printing press or a packaging machine. A machine of this type can also be designed as a (conveyor) system for manufacturing an automobile or for manufacturing components of an automobile (e.g. internal combustion engines or control units).

Further advantages and designs of the disclosure are set out in the description and the attached drawing.

The features mentioned above and still to be explained below are obviously usable not only in the respectively indicated combination, but also in other combinations or in isolation without departing the scope of the present disclosure.

BRIEF DESCRIPTION OF THE DRAWINGS

The disclosure is presented schematically in the drawing on the basis of example embodiments and is described in detail below with reference to the drawing.

DESCRIPTION OF THE FIGURES

Figure 1:
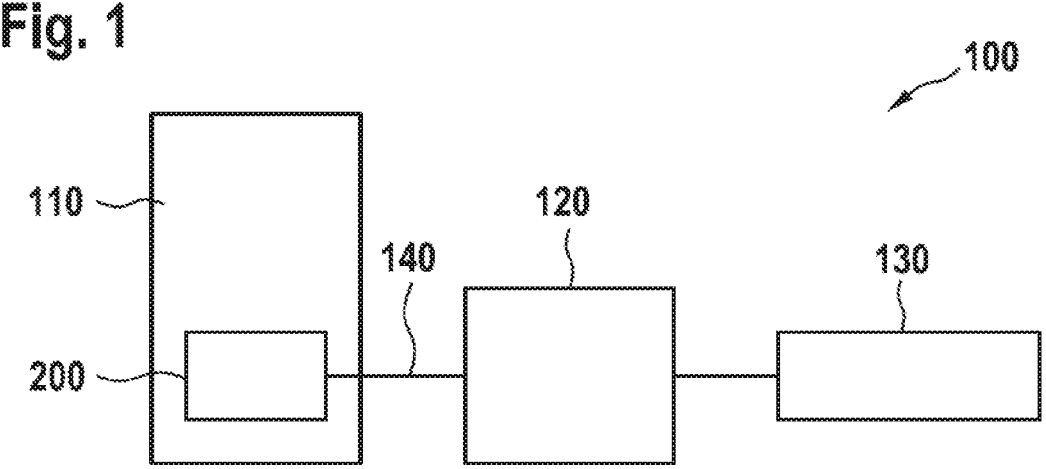

FIG. 1 shows schematically a preferred design of an automation system assembly according to the disclosure.

Figure 2:
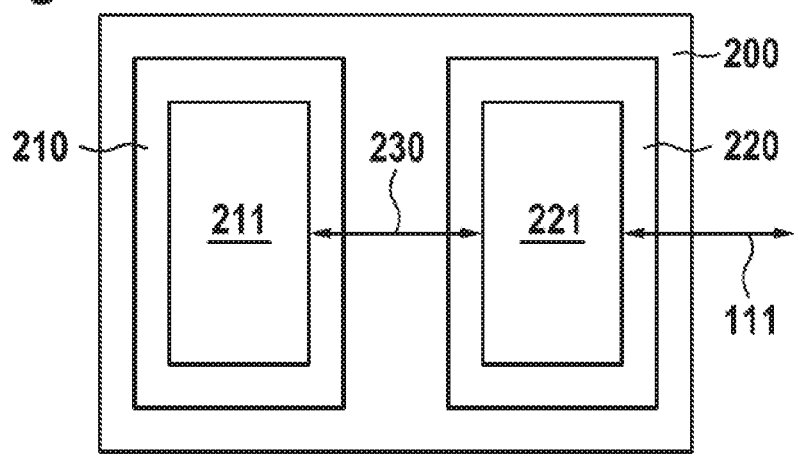

FIG. 2 shows schematically a preferred design of a safety module according to the disclosure.

Figure 3:
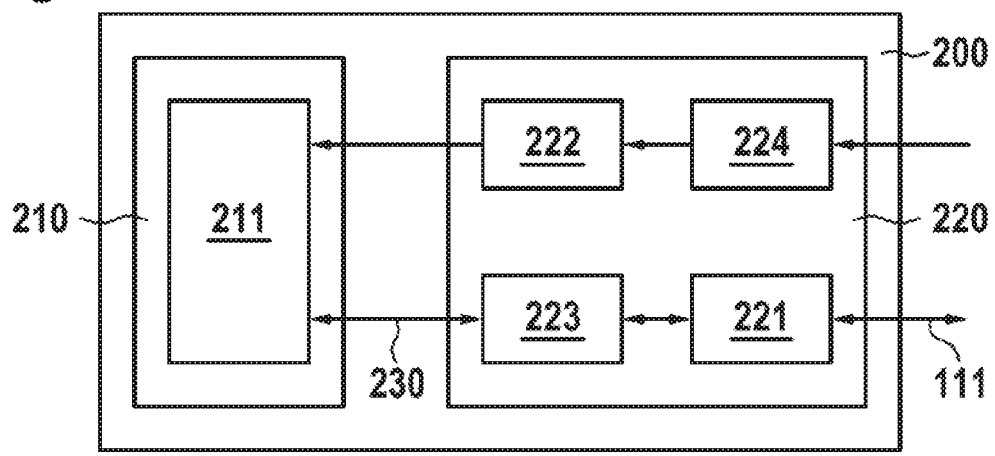

FIG. 3 shows schematically a further preferred design of a safety module according to the disclosure.

DETAILED DESCRIPTION

FIG. 1 shows schematically a machine denoted as 100. The machine is designed, for example, as a web processing machine, in particular a printing press.

The machine 100 has a control unit 110 for controlling the machine and can be designed, for example, as a stored program control (SPC). An electrical drive 120 (e.g. a synchronous motor) is further provided which can, for example, set a roller 130 in rotational motion. The control unit 110 is provided, in particular, to control or regulate the drive 120 and therefore the roller 130. The control unit 110 and the drive 120 have a data-transmitting connection to one another via a communication system 140, for example via a fieldbus.

The machine 100 can obviously also have further machine components, such as, for example, manipulators, actuators, further motors, rollers, control units, etc.

The control unit 110 is furthermore designed, in particular, as an automation system assembly, in particular a safety control. In order to implement a safe operation of this automation system assembly 110, a preferred design of a safety module 200 according to the disclosure is further provided. The safety module 200 is designed, for example, as a plug-in card and is inserted into a corresponding slot of the communication system 111 of the control unit 110 designed here, for example, as a PCI bus.

The safety module 200 is shown schematically in FIGS. 2 and 3 according to preferred designs of the present disclosure. Identical reference numbers in the figures denote identical or structurally identical elements.

As shown in FIG. 2, the safety module 200 has a safety component 210 and an adaptation component 220. The safety component 210 and the adaptation component 220 are constructed here on separate printed circuit boards as circuit carriers and are connected in such a way that they are mechanically detachable and reconnectable.

The safety component 210 is configured to implement the safe operation of the automation system assembly 110. The adaptation component 220 is configured to mediate between the safety component 210 and the communication system 111 of the automation system assembly 110 in order to incorporate the safety module 200 into the automation system assembly 110. The safety module 200 is thus designed, for example, as a plug-in card in the SPC 110 which performs safety-critical functions.

The safety component 210 has a safety logic 211 which can comprise, for example, logic units such as microcontrollers, memory units, etc. Corresponding safety software, in particular, is executed by this safety logic 211 in order to implement the safe operation of the automation system assembly 110.

The adaptation component 220 similarly also has adaptation logic 221 which can similarly comprise, for example, logic units such as microcontrollers, memory units, etc. Corresponding adaptation software is appropriately executed by this adaptation logic 221 in order to enable the incorporation of the safety module 200 into the automation system assembly 110.

The safety component 210 and the adaptation component 220 are designed as two separate, individual modules and have a data-transmitting and preferably also energy-transmitting connection to one another via in an internal communication system 230, in particular via an internal bus. The mechanical connection is implemented, in particular, by means of a plug/socket connector.

The safety component 210 is particularly advantageously a certified component, whereas the adaptation component 220 is a non-certified component. A flexible and simple incorporation of the safety module 200 into any communication systems is enabled through this modular design, appropriately with no certification requirement, as a result of which considerable cost savings and time savings are achieved.

The present disclosure thus particularly advantageously provides the division of the safety module 200 into two components or circuit boards 210 and 220, preferably into the certification-relevant safety component 210 and the non-certification-relevant adaptation component 220 with adaptation logic 221.

FIG. 3 shows the safety module 200 according to a further preferred design of the present disclosure. The adaptation component 220 further has means 222 for implementing an overvoltage protection, a voltage limitation or logic for the voltage limitation 223 for the safety component 210, and also a voltage converter 224.

What is claimed is:

1. A safety module for an automation system assembly, the safety module comprising:
   a safety component configured to implement a safe operation of the automation system assembly; and
   an adaptation component configured to mediate between the safety component and a communication system of the automation system assembly to incorporate the safety module into the automation system assembly,
   wherein the safety component and the adaptation component are constructed on separate circuit carriers and are connected to one another by a plug and socket connector so as to be mechanically detachable and reconnectable,
   wherein the adaptation component is preconfigured to connect the safety component with multiple different types of the communication system of the automation system assembly,
   wherein the adaptation component has a voltage limitation for the safety component, the voltage limitation being a voltage limitation for an internal communication system between the adaptation component and the safety component, and
   wherein the safety component is a security certified component and the adaptation component is a non-security certified component.

2. The safety module according to claim 1, wherein the communication system of the automation system assembly is a bus system and the adaptation component is configured to mediate between the safety component and the bus system.

3. The safety module according to claim 1, wherein the safety component and the adaptation component have a communication connection to one another via an internal communication system.

4. The safety module according to claim 3, wherein the adaptation component is configured to mediate between the internal communication system and the communication system of the automation system assembly.

5. The safety module according to claim 1, wherein the safety component has a safety logic and the adaptation component has an adaptation logic.

6. The safety module according to claim 1, wherein the safety component and the adaptation component in each case have their own printed circuit boards.

7. The safety module according to claim 1, wherein the adaptation component has a device configured to implement overvoltage protection.

8. The safety module according to claim 1, wherein the adaptation component has a voltage converter.

9. An automation system assembly comprising:
a communication system; and
a safety module comprising:
  a safety component configured to implement a safe operation of the automation system assembly; and
  an adaptation component configured to mediate between the safety component and the communication system of the automation system assembly to incorporate the safety module into the automation system assembly,
wherein the safety component and the adaptation component are constructed on separate circuit carriers and are connected to one another by a plug and socket connector so as to be mechanically detachable and reconnectable,
  wherein the adaptation component is preconfigured to connect the safety component with multiple different types of the communication system of the automation system assembly,
  wherein the adaptation component has a voltage limitation for the safety component, the voltage limitation being a voltage limitation for an internal communication system between the adaptation component and the safety component, and
  wherein the safety component is a security certified component and the adaptation component is a non-security certified component.

10. The automation system assembly according to claim 9, wherein the automation system assembly is one of a safety control and safe drive regulator.

11. A safety module according to claim 2, wherein the bus system is a host bus system.

12. The safety module according to claim 3, wherein the internal communication system is an internal bus system.

* * * * *